US011203376B2

(12) United States Patent
Rey et al.

(10) Patent No.: US 11,203,376 B2
(45) Date of Patent: Dec. 21, 2021

(54) CARRIAGE FOR DRIVING A VEHICLE STEERING SYSTEM ALLOWING A DISPLACEMENT OF A COVER PART IDENTICAL TO THE DISPLACEMENT OF A MOVABLE TUBE DURING A DEPTH SETTING AND DURING AN ACCIDENT

(71) Applicant: JTEKT EUROPE, Irigny (FR)

(72) Inventors: Laurent Rey, Villeurbanne (FR); Sylvain Duhamel, Lyons (FR); Boris Catherin, Décines (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 16/945,113

(22) Filed: Jul. 31, 2020

(65) Prior Publication Data

US 2021/0031826 A1    Feb. 4, 2021

(30) Foreign Application Priority Data

Jul. 31, 2019   (FR) ...................... 19/08750

(51) Int. Cl.
 *B62D 1/19*   (2006.01)
(52) U.S. Cl.
 CPC ................... *B62D 1/195* (2013.01)
(58) Field of Classification Search
 None
 See application file for complete search history.

(56) References Cited

U.S. PATENT DOCUMENTS

| 2016/0001809 | A1* | 1/2016 | Kingston-Jones | F16F 7/123 |
| | | | | 74/492 |
| 2019/0225254 | A1 | 7/2019 | Ishimura et al. | |
| 2019/0367073 | A1* | 12/2019 | Buker | B62D 1/184 |
| 2020/0207401 | A1* | 7/2020 | Martinez | B62D 1/181 |
| 2020/0207402 | A1* | 7/2020 | Fricke | B62D 1/195 |
| 2021/0024120 | A1* | 1/2021 | Rey | B62D 1/195 |

FOREIGN PATENT DOCUMENTS

JP         2010-208440 A    9/2010

* cited by examiner

*Primary Examiner* — Faye M Fleming
(74) *Attorney, Agent, or Firm* — Oliff PLC

(57) ABSTRACT

A drive carriage of a vehicle steering system positioned between a movable tube and a drive member, having an attachment zone intended to cooperate with the movable tube, the attachment zone making a fixation of the movable tube on the drive carriage when a force exerted on the attachment zone is below a first predetermined threshold and a movement of the movable tube relative to the drive carriage when the force exerted on the attachment zone exceeds the first predetermined threshold, the drive carriage comprises a coupling zone intended to cooperate with a cover part making the fixation of the cover part on the drive carriage when a force exerted on the coupling zone is below a second predetermined threshold and a movement of the cover part relative to the drive carriage when the force exerted on the second coupling zone exceeds the second predetermined threshold.

10 Claims, 4 Drawing Sheets

CARRIAGE FOR DRIVING A VEHICLE STEERING SYSTEM ALLOWING A DISPLACEMENT OF A COVER PART IDENTICAL TO THE DISPLACEMENT OF A MOVABLE TUBE DURING A DEPTH SETTING AND DURING AN ACCIDENT

The invention concerns the field of vehicle steering systems and more particularly to a drive carriage and a column of a steering system.

The object of a vehicle steering system is to allow a driver to control a vehicle trajectory by exerting a force on a steering wheel fixed to a steering column.

The steering column allows changing a position of the steering wheel relative to a vehicle frame. More specifically, the steering column allows in particular a depth setting of the steering wheel, that is to say along an elongation axis of the steering column.

For this, and as illustrated in FIG. 1, the steering column 1 comprises a movable tube 2, supporting the steering wheel, which slides concentrically in a fixed tube. The fixed tube is fixed relative to the frame of the vehicle 3. The depth setting is carried out by inserting the movable tube 2 into the fixed tube along the elongation axis X of the steering column 1. In other words, during the depth setting, the movable tube 2 is in translation relative to the fixed tube.

In the case of an electrically adjustable steering column 1, the movable tube 2 is driven in translation by a drive mechanism 4 comprising an electric motor 5, a worm screw 6 and a drive member 7. During the depth setting, the electric motor 5, fixed relative to the frame 3 of the vehicle, rotatably drives the worm screw 6 which carries the drive member 7. The drive member 7 then performs a translational movement according to an elongation axis of the worm screw 6, identical to the translational movement of the movable tube 2.

The movable tube 2 is fixed to the drive member 7 by means of a drive carriage 8 comprising an attachment zone 9 which allows the movable tube 2 to be fixed on the drive carriage 8 when a force exerted on the attachment zone 9 is below a predetermined threshold and a movement of the movable tube 2 relative to the drive carriage 8 when the force exerted on the attachment zone 9 exceeds the predetermined threshold. Thus, the attachment zone 9 allows on the one hand a rigid fixation of the movable tube 2 to the drive carriage 8 and therefore to the drive member 7 during the depth setting, and on the other hand a movement independent of the movable tube 2 relative to the drive carriage 8 and therefore to the drive member 7, in the case of an accident. Thus, during the depth setting the drive member 7 allows the movement of the movable tube 2, and in the case of an accident, the movable tube 2 can be inserted into the fixed tube while the drive member 7 remains fixed relative to the frame 3 of the vehicle; which is mandatory in order to ensure maximum safety for the driver and to absorb a portion of the impact in the case of a vehicle accident.

Furthermore, during the depth setting, the steering column 1 changes, in addition to the position of the steering wheel, a position of a cover part which makes it possible, on the one hand, to carry electric cables supplying control organs present on the steering wheel and on the other hand, to hide mechanical elements of the steering column 1 which are aesthetically unattractive and which include projecting angles which can injure the driver.

In order to ensure good holding of the cover part, it is generally fixed by two fixing points to the movable tube 2. The first fixing point is made in the vicinity of the steering wheel by means of a fixing leg 10 on the movable tube 2. The second fixing point is made on the movable tube at the drive mechanism.

Generally, the depth setting allows an adjustment of the position of the steering wheel over a distance comprised between 10 to 30 mm. Thus, during the depth setting, the cover part is displaced with the movable tube.

However, in vehicles comprising an autonomous or semi-autonomous driving mode, the depth setting of the steering wheel must be able to be carried out over a distance between 50 to 200 mm. It is therefore impossible to position the second fixing point on the movable tube as previously.

The object of the invention is to provide a second fixing point for the cover part which allows a displacement of the cover part identical to the displacement of the movable tube during the depth setting and during an accident.

For this, the invention relates to a drive carriage of a vehicle steering system positioned between a movable tube of a steering column and a drive member, the drive carriage comprising an attachment zone intended to cooperate with the movable tube, the attachment zone making a fixation of the movable tube on the drive carriage when a force exerted on the attachment zone is below a first predetermined threshold and a movement of the movable tube relative to the drive carriage when the force exerted on the attachment zone exceeds the first predetermined threshold, characterized in that the drive carriage comprises a coupling zone intended to cooperate with a cover part, the coupling zone making a fixation of the cover part on the drive carriage when a force exerted on the coupling zone is below a second predetermined threshold and a movement of the cover part relative to the drive carriage when the force exerted on the second coupling zone exceeds the second predetermined threshold.

The first predetermined threshold is selected as a function of the force exerted on the attachment zone during a depth setting of the steering column, that is to say of the setting of a steering wheel.

The second predetermined threshold is selected as a function of the force exerted on the coupling zone during a depth setting of the steering column.

The force exerted on the attachment zone and the force exerted on the coupling zone during a depth setting will be called «setting force» later. The setting force is lower than the first and the second predetermined thresholds.

The coupling zone allows creating a fixing point for the cover part at the level of the drive mechanism which ensures the driver safety. In other words, the coupling zone allows a displacement of the cover part identical to the displacement of the drive carriage during the depth setting and a displacement of the cover part different from the displacement of the drive carriage during a vehicle accident. In fact, during the depth setting, the setting force is lower than the second predetermined threshold, the coupling zone makes a fixation of the cover part on the drive carriage. During an accident, a driver will directly or indirectly exert a force on the cover part and on the movable tube. Said force will be transferred to the coupling zone and to the attachment zone and will be called «accident force» later. The force exerted on the coupling zone, corresponding to the accident force, is greater than the second predetermined threshold, the coupling zone then allows the movement of the cover part relative to the drive carriage. The cover part will have a different movement from the movement of the drive carriage.

According to a characteristic of the invention, the first predetermined threshold is substantially equal to the second predetermined threshold.

Thus, the attachment zone and the coupling zone have a fixing role when the setting force is below a predetermined threshold. In fact, when the driver makes a setting of the steering column by a manipulation of the steering wheel, he exerts a substantially similar force on the attachment zone and the coupling zone. In the case of an accident, the driver will generally exert the accident force on the steering wheel. The two zones therefore receive the same accident force. The two zones must then authorize a similar movement of the movable tube and the cover part.

According to a characteristic of the invention, the second predetermined threshold has a value comprised between 5N and 50N.

Thus, when the second predetermined threshold is comprised between 5N and 50N, the coupling zone allows the fixation of the cover part on the drive carriage during the setting force and the movement of the cover part relative to the drive carriage during the accident force.

According to a characteristic of the invention, the second predetermined threshold has a value of 20N.

According to a characteristic of the invention, the coupling zone makes a fixation of the cover part on the drive carriage by means of at least one retaining element which is breakable when the force exerted on the coupling zone is substantially equal to the second predetermined threshold.

Thus, the retaining element secures the cover part on the drive carriage as long as the force exerted by the driver on the steering column is less than the second predetermined threshold, and is cut so as to separate the cover part from the drive carriage when the force exerted by the driver on the steering column is greater than the second predetermined threshold.

According to a characteristic of the invention, the coupling zone makes the fixation of the cover part on the drive carriage by means of a friction force.

The friction force secures the cover part and the drive carriage so that a movement applied to one is reflected on the other.

According to a characteristic of the invention, the friction force has a value substantially equal to the second predetermined threshold.

Thus, as long as the force exerted by the driver on the steering column is less than the second predetermined threshold, the friction force between the cover part and the drive carriage allows the cover part and the drive carriage to be secured. However, the friction force is not sufficient to hold the cover part and the drive carriage together when the force exerted by the driver on the steering column is greater than the second predetermined threshold.

According to a characteristic of the invention, the coupling zone comprises at least one protrusion and a slide rail cooperating with the at least one protrusion.

The protrusion exerts the friction force on the rail.

Among the protrusion and the slide rail, one is secured to the cover part and the other is secured to the drive carriage.

As long as the force exerted by the driver on the steering column is lower than the second predetermined threshold, the protrusion is secured to the slide rail. Consequently, the cover part is secured to the drive carriage.

When the friction force is greater than the second predetermined threshold, the protrusion slides in the slide rail so as to authorize a movement of the cover part relative to the drive carriage. More specifically, the movement of the cover part relative to the drive carriage is guided by the slide rail.

The invention also relates to a column of a vehicle steering system comprising a cover part, a fixed tube, and a movable tube which is driven in translation by a drive mechanism, the drive mechanism comprising a drive carriage according to the invention.

According to a characteristic of the invention, the slide rail is formed in the cover part.

Thus, the slide rail is an intrinsic portion of the cover part, that is to say that the slide rail cannot be separated from the cover part without degrading said cover part.

In this way, the production of the steering column according to the invention is facilitated.

According to a characteristic of the invention, the slide rail is provided with at least one assembly element intended to fix said slide rail on the cover part.

Thus, the slide rail can be a complex part allowing a more precise adjustment of the protrusion in the slide rail. In this way, it is easier to determine the friction force exerted between the slide rail and the protrusion.

The invention will be better understood from the description below, which relates to several embodiments according to the present invention, given by way of non-limiting examples and explained with reference to the appended schematic drawings, in which.

In the different embodiments described below, the identical elements have an identical numeral reference.

Figure 1:
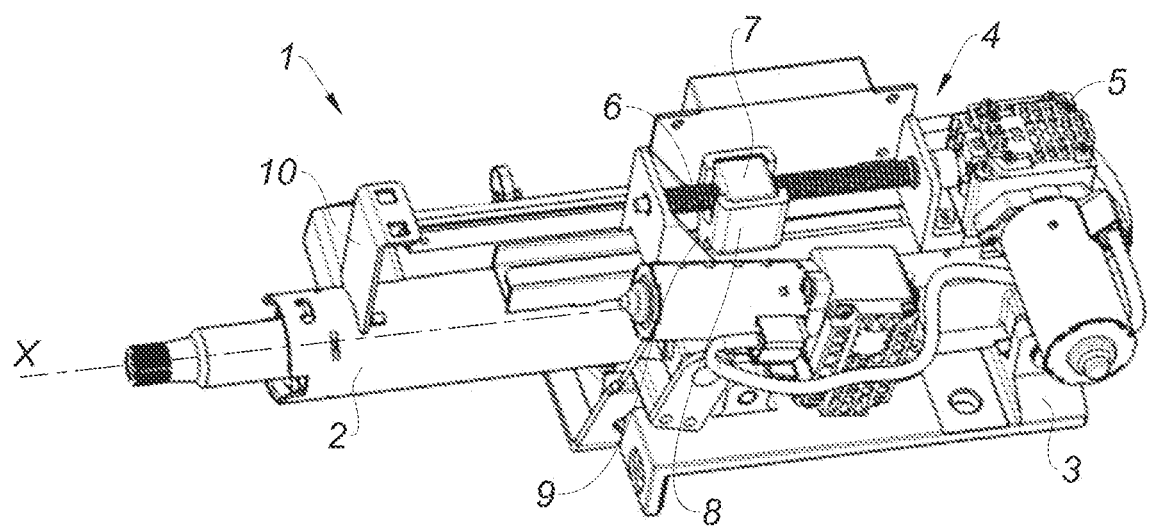
FIG. 1 is a representation of a steering column of a vehicle according to the state of the art.

A steering column 1 as illustrated in FIGS. 1 to 7, comprises a movable tube 2, supporting a steering wheel, which slides concentrically in a fixed tube. The depth setting is carried out by inserting the movable tube 2 into the fixed tube along an elongation axis X of the steering column 1. Furthermore, the movable tube 2 is driven in translation by a drive mechanism 4 comprising an electric motor 5, a worm screw 6 and a drive member 7. During the depth setting, the electric motor 5, fixed relative to the frame 3 of the vehicle, drives in rotation the worm screw 6 which carries the drive member 7. The drive member 7 then performs a translational movement along an elongation axis of the worm screw 6, identical to the translational movement of the movable tube 2.

The movable tube 2 is fixed to the drive member 7 by means of a drive carriage 8, 8', 8", 8''' comprising an attachment zone 9 which allows a fixation of the movable tube 2 on the drive carriage 8, 8', 8", 8''' when a force exerted on the attachment zone 9 is below a predetermined threshold and a movement of the movable tube 2 relative to the drive carriage 8, 8', 8", 8''' when the force exerted on the attachment zone 9 exceeds the predetermined threshold. The drive carriage 8, 8', 8", 8''' is fixed on the drive member 7.

The steering column 1 also comprises a cover part 11', 11", 11'". The cover part 11', 11", 11'" is an empty shell which at least partially envelops the movable tube 2.

The cover part 11', 11", 11'" is fixed to the movable tube 2 by means of a first fixing point produced near the steering wheel by means of a fixing leg 10 on the movable tube 2.

The cover part 11', 11", 11'" is fixed to the movable tube 2 by means of a second fixing point produced at level of the drive mechanism 4, and more precisely at the drive carriage 8', 8", 8'".

Figure 2:
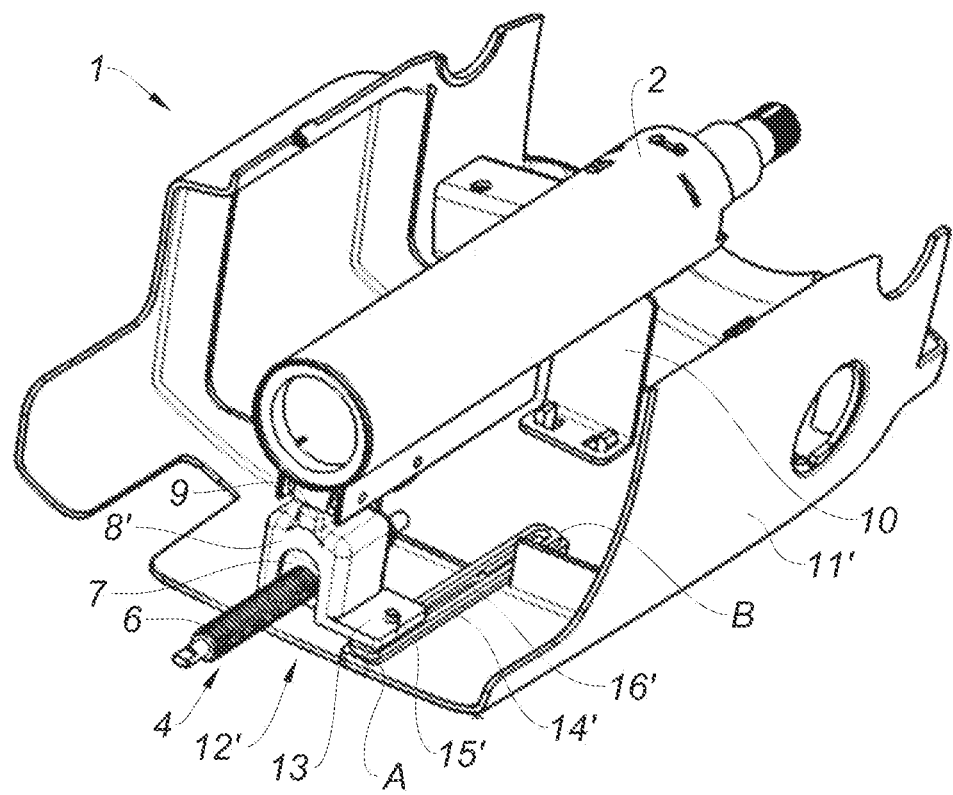
FIG. 2 is a top view representation of a first embodiment of a steering column according to the invention.
Figure 3:
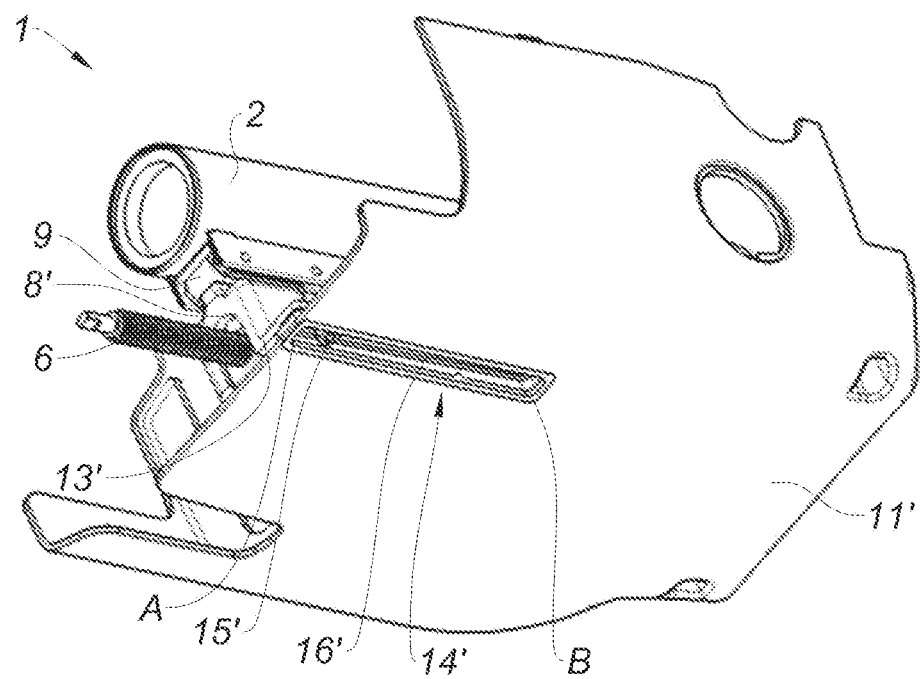
FIG. 3 is a top view representation of the first embodiment of a steering column according to the invention.

A first embodiment of the drive carriage 8' is illustrated in FIGS. 2 and 3. The drive carriage 8' according to the first embodiment has a coupling zone 12' comprising a protrusion 13' cooperating with a slide rail 14'.

The protrusion 13' is an elongation extending along a plane substantially parallel to the plane in which the cover part 11' extends at the level of said elongation. The protrusion 13' comprises a clamping element 15'. For example, the clamping element 15' is a clamping screw. The clamping element 15' is inserted into the slide rail 14'. The clamping element 15' fixes the slide rail 14' to the drive carriage 8' by means of a friction force. The value of said friction force is equal to a second predetermined threshold.

The slide rail 14' is formed in the cover part 11', that is to say that the slide rail 14' is inseparable from the cover part 11' without degrading thereof. The slide rail 14' extends along the elongation axis X of the steering column 1. The slide rail 14' has a through slot 16' into which the clamping element 15' is transversely introduced.

During the mounting of the cover part 11' on the steering column 1, the clamping element 15' is inserted at a first end A of the slide rail 14'.

During a depth setting of the steering column 1, a force exerted on the coupling zone is below the second predetermined threshold. Thus, the friction force exerted between the clamping element 15' and the slide rail 14' allows the fixation, that is to say a common movement, of the slide rail 14' and the clamping element 15'.

During a vehicle accident, the driver directly or indirectly exerts a force on the coupling zone 12' below the second predetermined threshold. In this situation, the friction force exerted between the clamping element 15' and the slide rail 14' is not sufficient to hold the fixation of the slide rail 14' and the clamping element 15'. The clamping element 15' will remain secured to the drive carriage 8' and therefore to the frame 3 of the vehicle, while the slide rail 14' will remain secured to the cover part 11' movable relative to the frame of the vehicle 3. The clamping element 15' will therefore slide in the slide rail 14' so as to pass from the first end A of the slide rail 14' to a second end B of the slide rail 14'.

Figure 4:
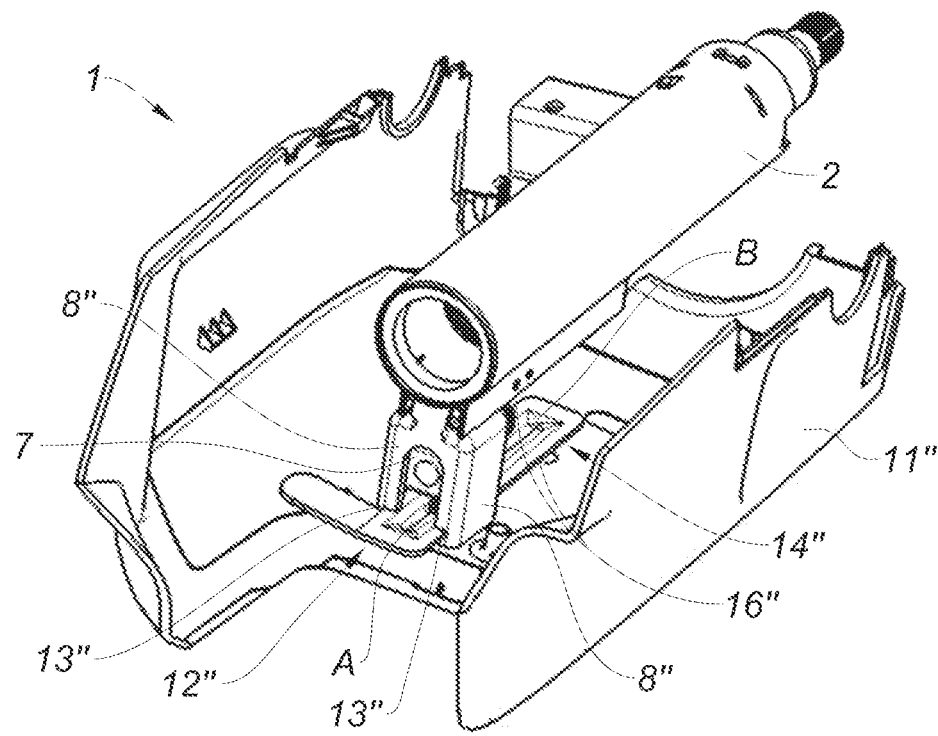
FIG. 4 is a top view representation of a second embodiment of a steering column according to the invention.
Figure 5:
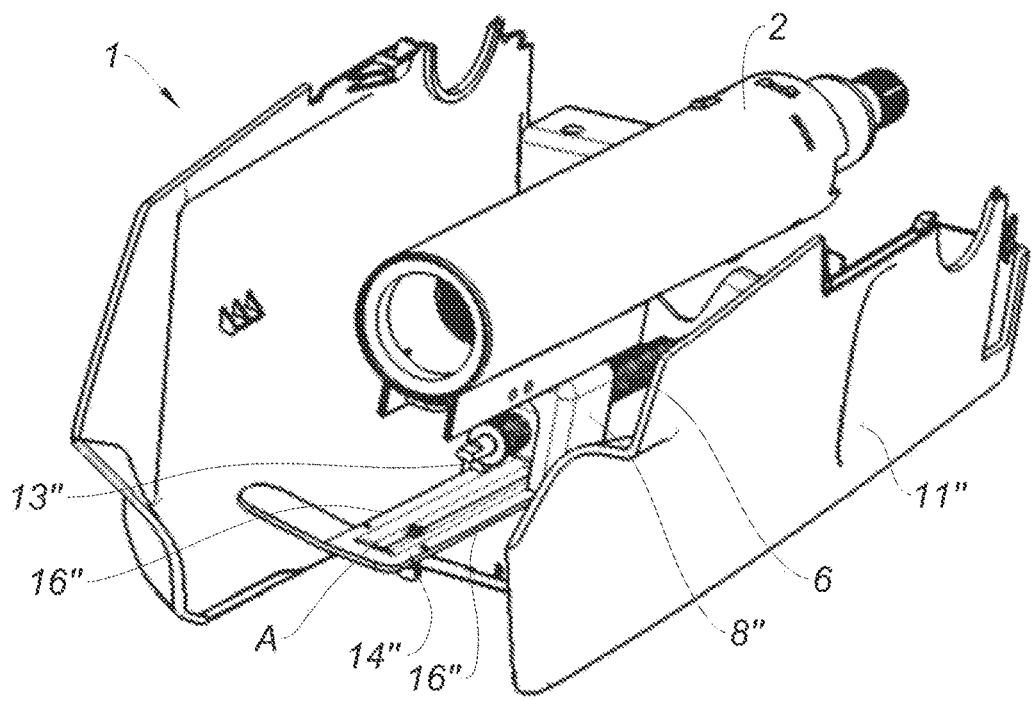
FIG. 5 is a top view representation of the second embodiment of a steering column according to the invention after a vehicle accident.

A second embodiment of the drive carriage 8" is illustrated in FIGS. 4 and 5. The drive carriage 8" according to the second embodiment has a coupling zone 12" comprising two protrusions 13" cooperating with a slide rail 14".

Each protrusion 13" has a jaw shape. Each protrusion 13" surrounds an edge 16" of the slide rail 14". Each protrusion 13" fixes the slide rail 14" to the drive carriage 8" by means of a friction force. The value of said friction force is equal to a second predetermined threshold.

The slide rail 14" is attached to the cover part 11", that is to say that the slide rail 14" can be separated from the cover part 11" without degrading thereof. The slide rail 14" is fixed to the cover part 11" by means of an assembly element not represented. The slide rail 14" extends along the elongation axis X of the steering column 1. The slide rail 14" has two edges 16" on which the protrusions 13" are fixed. The edges 16" are not in contact with the cover part 11".

During the mounting of the cover part 11" on the steering column 1, the protrusions are positioned at a first end A of the slide rail 14".

During the depth setting of the steering column 1, a force exerted on the coupling zone is below the second predetermined threshold. Thus, the friction force exerted between the protrusions 13" and the edges 16" of the slide rail 14" allows a fixation, that is to say a common movement, of the slide rail 14" and the protrusions 13".

During a vehicle accident, the driver directly or indirectly exerts a force on the coupling zone 12" below the second predetermined threshold. In this situation, the friction force exerted between the protrusions 13" and the slide rail 14" is not sufficient to hold the fixation of the slide rail 14" and the protrusions 13". The protrusions 13" will remain secured to the drive carriage 8" and therefore to the frame 3 of the vehicle, while the slide rail 14" will remain secured to the cover part 11" movable relative to the frame of the vehicle 3. The protrusions 13" will therefore slide in the slide rail 14" so as to pass from the first end A of the slide rail 14" to a second end B of the slide rail 14" as illustrated in FIG. 5.

Figure 6:
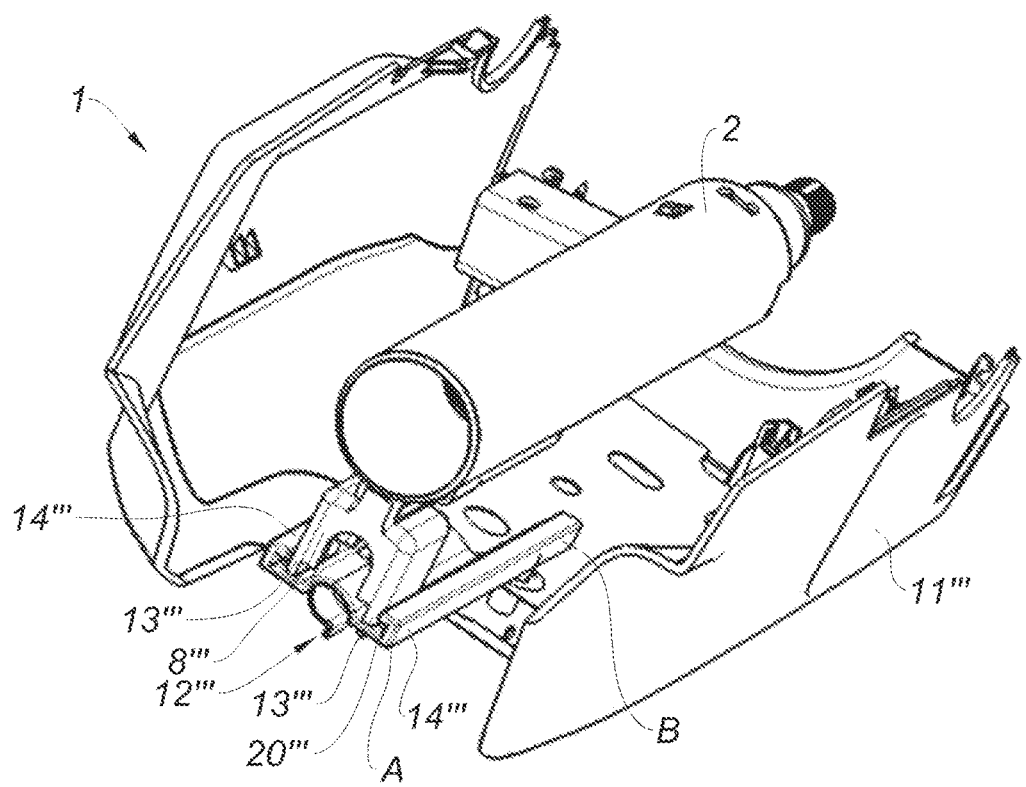
FIG. 6 is a top view representation of a third embodiment of a steering column according to the invention.
Figure 7:
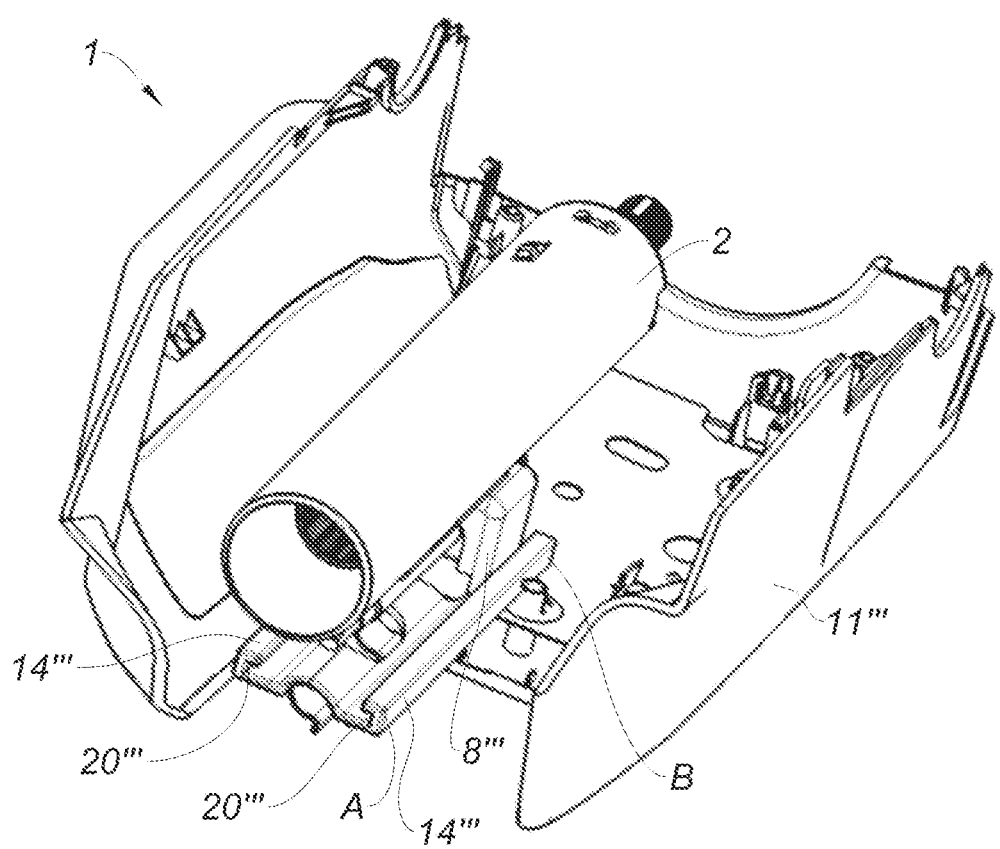
FIG. 7 is a top view representation of the third embodiment of a steering column according to the invention after a vehicle accident.

A third embodiment of the drive carriage 8'" is illustrated in FIGS. 6 and 7. The drive carriage 8'" according to the third embodiment has a coupling zone 12'" comprising two protrusions 13'" each cooperating with a slide rail 14'".

Each protrusion 13'" has an elongation. Each elongation is introduced into a slide rail 14'". Each elongation fixes the slide rail 14'" to the drive carriage 8'" by means of a friction force. The value of said friction force is equal to a second predetermined threshold.

The slide rails 14'" are fixed on either side of a sliding part which is attached to the cover part 11'", that is to say that the sliding part is separable from the cover part 11'" without degrading thereof. The sliding part is fixed to the cover part 11'" by means of an assembly element not represented. The slide rails 14'" extend along the elongation axis X of the steering column 1. Each slide rail 14'" has a U shape 20'" into which an elongation is introduced.

During the mounting of the cover part 11'" on the steering column 1, the protrusions 13'" are positioned at a first end A of the slide rail 14'".

During the depth setting of the steering column 1, a force exerted on the coupling zone is below the second predetermined threshold. Thus, the friction force exerted between the protrusions 13'" and the slide rails 14'" allows a fixation, that is to say a common movement, of the slide rails 14'" and the protrusions 13'".

During a vehicle accident, the driver directly or indirectly exerts a force on the coupling zone 12'" below the second predetermined threshold. In this situation, the friction force exerted between the protrusions 13'" and the slide rails 14'" is not sufficient to hold the fixation of the slide rails 14'" and the protrusions 13'". The protrusions 13'" will remain secured to the drive carriage 8'" and therefore to the frame 3 of the vehicle, while the slide rails 14'" will remain secured to the cover part 11'" movable relative to the vehicle frame 3. The protrusions 13'" will therefore slide in the slide rails 14'" so as to pass from the first end A of the slide rails 14'" to a second end B of the slide rails 14'" as illustrated in FIG. 7.

Each of the embodiments described above can advantageously also comprise a retaining element, not represented, which is breakable when the force exerted on the coupling zone is substantially equal to the second predetermined threshold.

Of course, the invention is not limited to the embodiments described and represented in the appended figures. Modifications remain possible, in particular from the point of view of the constitution of the various elements or by substitution of technical equivalents, without thereby departing from the scope of protection of the invention.

The invention claimed is:

1. A drive carriage of a vehicle steering system positioned between a movable tube of a steering column and a drive member, the drive carriage comprising an attachment zone intended to cooperate with the movable tube, the attachment zone making a fixation of the movable tube on the drive carriage when a force exerted on the attachment zone is below a first predetermined threshold and a movement of the movable tube relative to the drive carriage when the force exerted on the attachment zone exceeds the first predetermined threshold, wherein the drive carriage comprises a coupling zone intended to cooperate with a cover part, the coupling zone making a fixation of the cover part on the drive carriage when a force exerted on the coupling zone is below a second predetermined threshold and a movement of the cover part relative to the drive carriage when the force exerted on the second coupling zone exceeds the second predetermined threshold.

2. The drive carriage according to claim 1, wherein the first predetermined threshold is substantially equal to the second predetermined threshold.

3. The drive carriage according to claim 1, wherein the second predetermined threshold has a value comprised between 5N and 50N.

4. The drive carriage according to claim 1, wherein the coupling zone makes the fixation of the cover part on the drive carriage by means of at least one retaining element which is breakable when the force exerted on the coupling zone is substantially equal to the second predetermined threshold.

5. The drive carriage according to claim 1, in which the coupling zone makes the fixation of the cover part on the drive carriage by means of a friction force.

6. The drive carriage according to claim 5, wherein the friction force has a value substantially equal to the second predetermined threshold.

7. The drive carriage according to claim 5, wherein the coupling zone comprises at least one protrusion and a slide rail cooperating with the at least one protrusion.

8. A column of a vehicle steering system comprising a cover part, a fixed tube, and a movable tube which is driven in translation by a drive mechanism, the drive mechanism comprising a drive carriage according to claim 1.

9. The column of a vehicle steering system comprising a cover part, a fixed tube, and a movable tube which is driven in translation by a drive mechanism, the drive mechanism comprising a drive carriage according to claim 7, wherein the slide rail is formed in the cover part.

10. The column of a vehicle steering system comprising a cover part, a fixed tube, and a movable tube which is driven in translation by a drive mechanism, the drive mechanism comprising a drive carriage according to claim 7, wherein the slide rail is provided with at least one assembly element intended to fix said slide rail on the cover part.

* * * * *